(12) United States Patent
Nishizawa et al.

(10) Patent No.: US 8,001,772 B2
(45) Date of Patent: Aug. 23, 2011

(54) METHOD FOR REGENERATING EXHAUST GAS PURIFYING FILTER APPARATUS

(75) Inventors: Toru Nishizawa, Yokohama (JP); Hiroaki Kaneko, Yokohama (JP); Hitoshi Onodera, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 961 days.

(21) Appl. No.: 11/728,351

(22) Filed: Mar. 26, 2007

(65) Prior Publication Data

US 2007/0220868 A1    Sep. 27, 2007

(30) Foreign Application Priority Data

Mar. 27, 2006 (JP) .................................. 2006-084840

(51) Int. Cl.
*F01N 3/00* (2006.01)
(52) U.S. Cl. .................. 60/295; 60/274; 60/297; 60/311
(58) Field of Classification Search .................. 60/274, 60/278, 285, 286, 295, 297, 311
See application file for complete search history.

(56) References Cited

U.S. PATENT DOCUMENTS

| | | | |
|---|---|---|---|
| 6,390,035 B2 | 5/2002 | Moteki et al. | |
| 6,679,052 B2 * | 1/2004 | Nakatani et al. | 60/297 |
| 6,735,941 B2 * | 5/2004 | Saito et al. | 60/295 |
| 6,786,041 B2 * | 9/2004 | Itoh et al. | 60/274 |
| 6,823,665 B2 * | 11/2004 | Hirota et al. | 60/296 |
| 6,829,890 B2 * | 12/2004 | Gui et al. | 60/295 |
| 6,829,891 B2 * | 12/2004 | Kato et al. | 60/297 |
| 2005/0198945 A1 | 9/2005 | Okugawa et al. | |
| 2006/0016180 A1 | 1/2006 | Tomita et al. | |

FOREIGN PATENT DOCUMENTS

JP    2003-269221    9/2003

OTHER PUBLICATIONS

Saishin No Tanso Zairyou Jikkenn Gijutsu/Bunseki Kaiseki Hen [Latest Carbon Material Experimental Techniques, Book: Analysis], p. 89, left column, line 1 to p. 89, right column, line 20, Sipec (Nov. 2001).
Shin Tanso Zairyou Nyumon [New Introduction to Carbon Materials], p. 24, left column, line 1 to p. 24, right column, line 21, Sipec (Aug. 1998).
Office Action in Japanese Patent Application No. 2006-084840, dated Oct. 26, 2010, (2 pages).
Extended European Search Report in Patent Application No. 07104774.0-2311, dated Mar. 9, 2011 (5 pages).

* cited by examiner

*Primary Examiner* — Binh Q Tran
(74) *Attorney, Agent, or Firm* — Osha • Liang LLP

(57) ABSTRACT

The present invention relates to a method for regenerating a filter that traps particulate matter contained in exhaust gas of an internal combustion engine. The regeneration method includes increasing an amount of soot having a low degree of graphitization in the filter. After the amount of soot having the low degree of graphitization is increased, a temperature of the filter is increased.

15 Claims, 14 Drawing Sheets

METHOD FOR REGENERATING EXHAUST GAS PURIFYING FILTER APPARATUS

CROSS REFERENCES TO RELATED APPLICATIONS

This application claims priority from Japanese Patent Application Serial No. 2006-084840 filed Mar. 27, 2006, the entire contents of which are incorporated herein by reference.

FIELD OF THE INVENTION

The present invention relates to exhaust gas aftertreatment systems for diesel engines and in particular to a method for regenerating a diesel particulate filter (DPF) that traps and removes particulate matter (PM) in the exhaust gas and an exhaust gas purifying apparatus including a filter.

BACKGROUND

According to a known diesel particulate filter (referred to as DPF hereinafter) disposed downstream of a diesel engine to trap particulate matter (referred to as PM hereinafter) in the exhaust gas from a diesel engine, the trapping functions of the DPF are recovered or regenerated by burning the trapped PM.

In order to regenerate the DPF, the bed temperature of the DPF must be increased to a burning temperature of the PM. This has been accomplished by increasing the temperature of the exhaust gas to about 600° C. to 650° C. by control such as increasing the fuel injection quantity, throttling the intake air, retarding the fuel injection timing, or the like. A temperature of 600° C. to 650° C. is necessary to burn the soot in the PM.

However, because the fuel injection quantity and the fuel injection timing deviate from appropriate levels determined on the basis of the engine operating conditions (or the driving conditions in the case of an engine operated in a vehicle), during the course of regenerating the DPF as described above, there arise problems of decreased output and decreased fuel consumption.

In order to overcome these problems, Japanese Unexamined Patent Application Publication No. 2003-269221 (JP '221) provides the following technique.

First, before starting DPF regeneration, after-injection is conducted to increase the ratio of the soluble organic fraction (SOF) composed of unburned hydrocarbons (HC) and oils in the PM. The SOF is present in the exhaust gas by adhering on the surface of the soot or the like and becomes trapped in the catalyst unit as the exhaust gas passes through the catalyst unit.

The SOF has a relatively low burning temperature and easily starts burning by oxidation reaction in the catalyst unit.

Utilizing the burning property of the SOF, the exhaust gas temperature is increased until the temperature reaches the burning temperature of the SOF, and the temperature is subsequently allowed to increase to the burning temperature of the soot using the heat of combustion from the SOF.

However, using the SOF as a heat source as described in JP '221 has the following problem. That is, if the exhaust gas temperature is increased up to the range of about 300° C. to 450° C. as a result of driving conditions of the engine, the SOF on the soot is removed, and there may not be sufficient SOF to increase the exhaust gas temperature to a temperature that burns the soot. Moreover, if an oxidation catalyst is disposed upstream of the DPF, the SOF is removed by the oxidation catalyst and does not reach the DPF. In other words, the SOF may not adhere to the soot in the DPF.

SUMMARY

According to one or more embodiments of the present invention a method is provided for regenerating a filter of the type that traps particulate matter contained in exhaust gas of an internal combustion engine. The regeneration method includes increasing an amount of soot having a low degree of graphitization in the filter (also referred to as "low-graphitized soot" hereinafter), and increasing a temperature of the filter after the amount of low-graphitized soot is increased.

DETAILED DESCRIPTION

Figure 1:
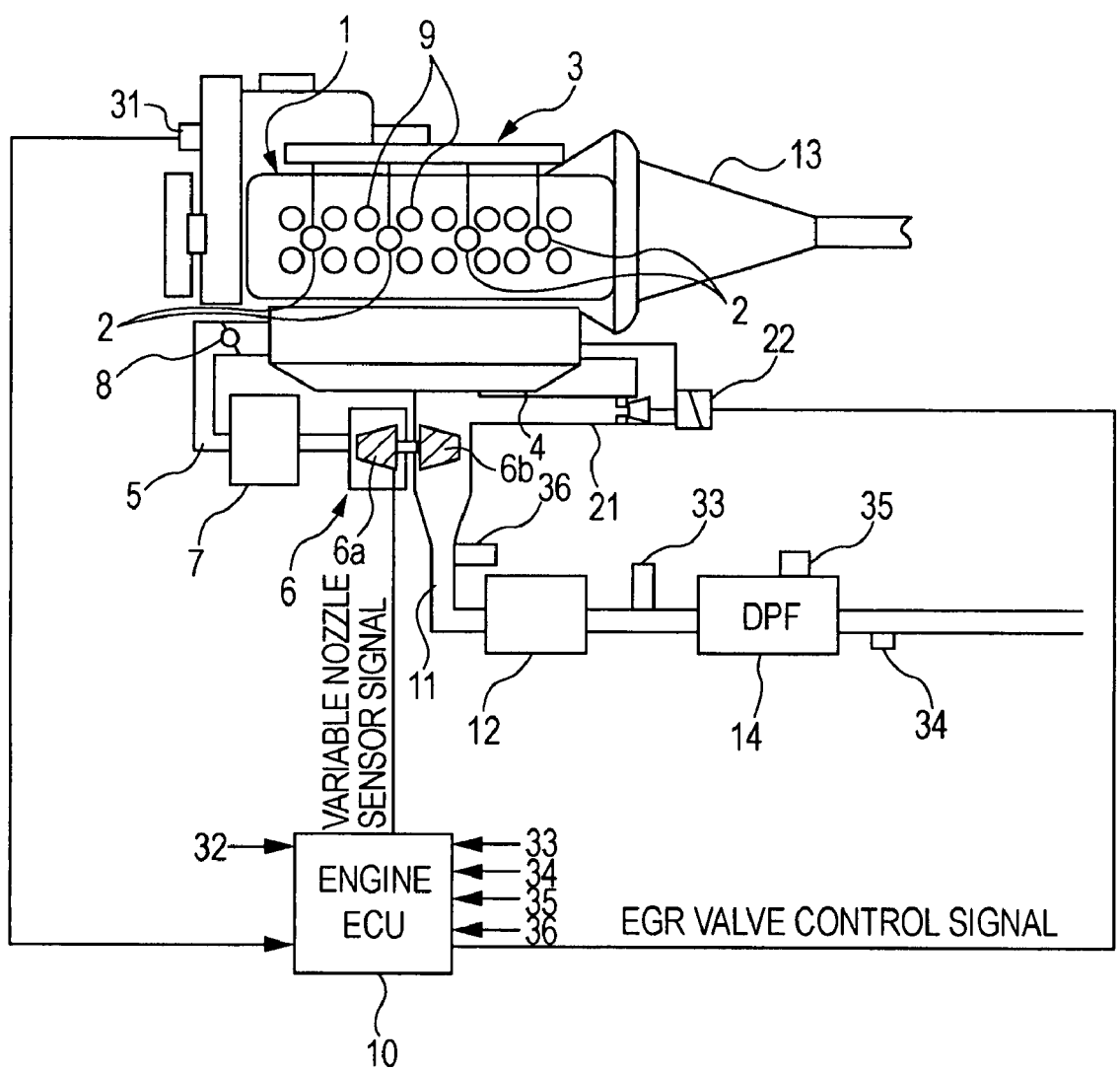
FIG. 1 is a schematic structural diagram of a system to which an embodiment of the invention is applied.

According to one or more embodiments of the present invention PM is removed by burning during the DPF regeneration even when the increase in the exhaust gas temperature is small.

According to one or more embodiments of the present invention a method is provided for regenerating a filter that traps particulate matter contained in exhaust gas of an internal combustion engine. The regeneration method includes increasing an amount of soot having a low degree of graphitization in the filter (also referred to as "low-graphitized soot" hereinafter). After the amount of low-graphitized soot is increased, a temperature of the filter is increased.

According to another embodiment of the present invention an exhaust gas purifying apparatus is provided for an internal combustion engine. The exhaust gas purifying apparatus includes a filter that traps particulate matter contained in exhaust gas of an internal combustion engine and a controller connected to the internal combustion engine. The controller operates the internal combustion engine so as to increase the amount of low-graphitized soot in the filter, and, after the amount of the low-graphitized soot in the filter is increased, operates the internal combustion engine so as to increase the temperature of the filter.

According to one embodiment of the present invention, it is possible to ensure that the temperature of the filter is increased to a temperature at which soot with a high degree of graphitization (also referred to as "high-graphitized soot" hereinafter) burns, i.e., to obtain a temperature at which the PM as a soot burns, by utilizing the heat of combustion from the low-graphitized soot. The desired raise in temperature may be accomplished even when the rise in exhaust gas temperature due to engine operation is small.

Embodiments of the present invention will now be described with reference to the drawings. Like items in the drawing figures are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiment of the present invention are described with reference to the drawings. Referring to FIG. 1, a system to which the invention is applied includes a diesel engine main unit 1, fuel injection valves 2 of cylinders (not shown for clarity) of the engine 1, a fuel injection device 3 (that may for example be common rail fuel injection device having an accumulator for storing high-pressure fuel, and may be referred to hereinafter as a common rail fuel injection device without limiting the invention to that specific type of fuel injection device), an intake collector 4, an intake channel 5, an exhaust gas channel 11, a control unit 10 for performing various controls, and a transmission 13 that transmits the driving force from the diesel engine main unit 1 to the drive shaft. The transmission 13 may be, for example, a stepless transmission (continuously variable transmission) or a stepped transmission.

High-pressure fuel is fed to the fuel injection valves 2 through the common rail fuel injection device 3. The fuel injection valves 2 open and close according to injection signals from the engine control unit (ECU) 10 and inject high-pressure fuel into the cylinders of the diesel engine main unit 1.

The intake channel 5 is connected to the intake collector 4 that is connected to the intake ports (not shown) of the diesel engine main unit 1. Along the intake channel 5 there is a variable-nozzle turbocharger 6 having a compressor 6a of for supercharging air from the upstream-side. An intercooler 7 is also provided along intake channel 5 for cooling the compressed and heated air from the compressor 6a. An intake throttling valve 8 is disposed along intake channel 5 for controlling the amount of intake air.

Exhaust gas emitted from the cylinders of the engine 1 flows out of the exhaust gas valves 9 and along an exhaust gas channel 11. A turbine 6b of the turbocharger 6 is disposed along the exhaust gas channel 11. The exhaust gas flows over the turbine 9b and through an oxidation catalyst 12 that oxidizes unburned components in the exhaust gas. An exhaust gas trap (DPF) 14 traps particulate matter (PM) in the exhaust gas. The exhaust gas flows along the exhaust gas channel from the upstream side (i.e., from the engine) and through the components generally in the order as described. Each exhaust gas valve 9 may be provided with a variable valve timing mechanism (not shown) that changes the timing of opening and closing the exhaust gas valve 9.

An exhaust gas recirculation (EGR) channel 21 branches from the exhaust gas channel 11 at a position upstream of the turbine 6b and is connected to the intake collector 4. The EGR channel 21 has an EGR valve 22, which controls the amount of exhaust gas returning to the intake according to operating conditions of the engine 1, and in the case of an engine that provides power to a vehicle, according to the vehicle driving conditions.

Detection signals are input to the control unit (ECU) 10 from various sensors for detecting various engine operating conditions. For example, such sensors may include one or more of the following: an engine speed sensor 31 for detecting the engine speed, an accelerator position sensor 32 for detecting the position of the accelerator pedal, an exhaust gas pressure sensor 33 for detecting the exhaust gas pressure of the exhaust gas channel 11 between the oxidation catalyst 12 and a DPF 14, an exhaust gas air-fuel ratio sensor 34 for detecting the exhaust gas air-fuel ratio downstream of the DPF 14, a thermal sensor 35 for detecting the temperature of the DPF 14, a thermal sensor 36 for detecting the exhaust gas temperature disposed upstream of the oxidation catalyst 12, and etc. The sensors input the detection signals representing the detected engine operating conditions to the ECU 10 and on the basis of these detection signals, the ECU 10 calculates and outputs signals for controlling the operation of the engine. For example, the ECU may provide signals such as a signal for controlling the position of the variable nozzle vane of the variable-nozzle turbocharger 6, a signal for controlling the opening of the EGR valve 22, and a signal for controlling the opening of the intake throttling valve 8. Furthermore, the ECU 10 may function as a means for detecting the amount of PM deposited in the DPF 14, for example based upon the detection signals, and may calculate and outputs a signal for controlling the quantity of fuel injected from the fuel injection valves 2. The ECU 10 may also function as a means for determining when to start the regeneration of the DPF 14 and how to control the regeneration. The ECU may function as a means for increasing the temperature of the exhaust gas, and may calculate and output a signal for operating the fuel injection valves 2 that supply fuel necessary for increasing the exhaust gas temperature.

Controlling the regeneration of the DPF executed by the ECU 10 will now be described with reference to FIGS. 2 to 5.

DPF regeneration is started when the amount PM deposited in the DPF 14 reaches a predetermined level. The bed temperature of the DPF 14 is increased to about 600° C. to 650° C., i.e., the temperature at which the PM burns (referred to as "burning temperature" hereinafter), by increasing the exhaust gas temperature or by directly heating the DPF 14 with a heater or the like. Hereinafter control over the increase in the temperature of the exhaust gas may be referred to as "heating control". In this manner, the PM deposited in the DPF 14 can be burned and removed, and the capacity of the DPF 14 to trap the PM can be recovered or regenerated.

The PM contains inorganic carbon called soot and a hydrocarbon described here as a soluble organic fraction called SOF. The burning temperature of the soot is relatively high, i.e., about 600° C. to 650° C. During typical DPF regeneration control, the bed temperature of the DPF 14 is increased to about 600° C. to 650° C. to ensure that soot is burned.

Figure 13:
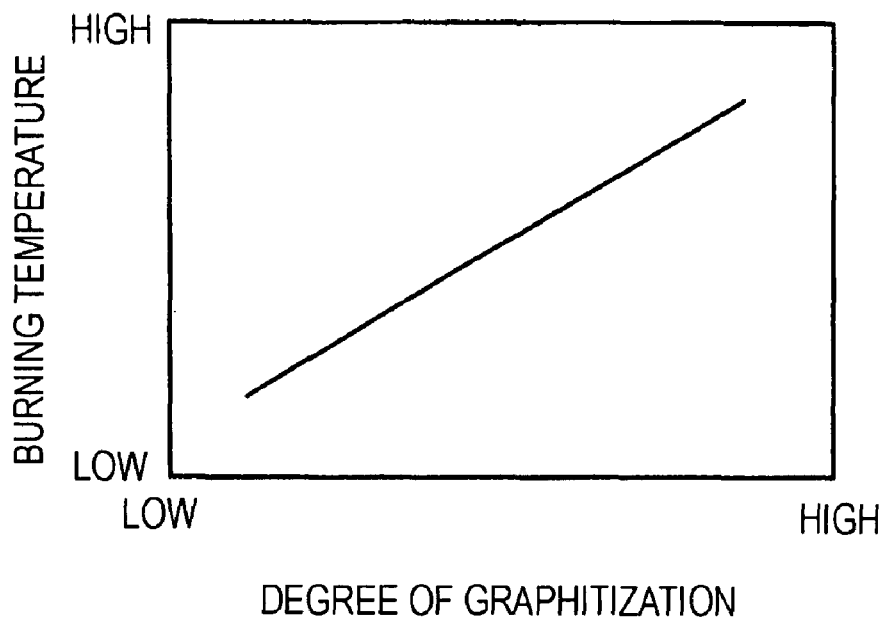
FIG. 13 is a graph showing the relationship between the burning temperature of the soot and the degree of graphitization.
Figure 16A:
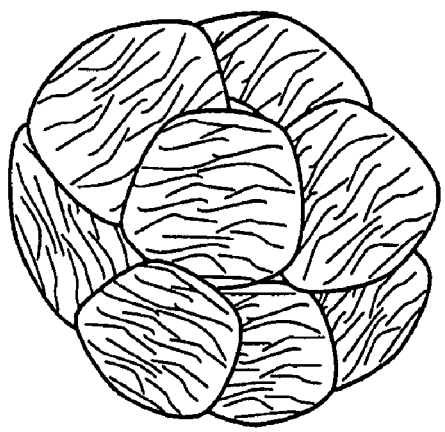
FIG. 16A is an illustration of PM with soot having a low degree of graphitization and FIG. 16B is an illustration of PM with soot having a high degree of graphitization.
Figure 16B:
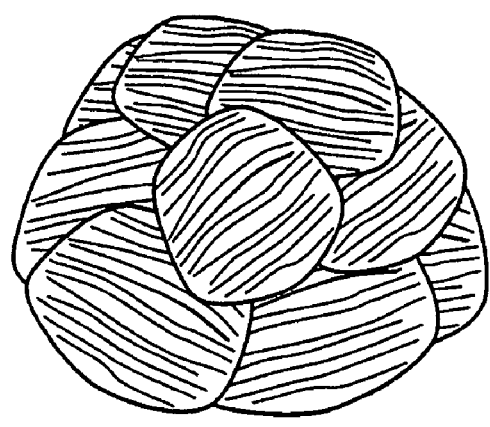

It has been found by the inventors that the burning temperature of the soot depends, at least in part, upon the degree of graphitization of the soot. As shown in FIG. 13, the lower the degree of graphitization, the lower the burning temperature. The burning temperature increases with the degree of graphitization. The soot with a low degree of graphitization (also referred to as "low-graphitized soot") starts burning at a temperature higher than about 300° C. to 400° C. before the bed temperature reaches a temperature of about 600° C. to 650° C. FIGS. 16A and 16B are each a schematic illustration of PM coated with low-graphitized soot and a schematic illustration of PM coated with high-graphitized soot, respectively. The layers that appear as streaks in the surface of the PM with a low degree of graphitization are less ordered, and more fragmented than those of the PM with a high degree of graphitization. The more ordered and continuous the soot layer on the PM, the higher the degree of graphitization and the closer the crystal structure is to that of graphite. Whereas the burning temperature of the graphite with a high degree of graphitization is high, the burning temperature of the soot with a low degree of graphitization is low (low graphitized soot may be considered more highly combustible than highly graphitized soot). It is theorized that this is because carbon with a low degree of graphitization, i.e., with a less ordered crystal structure, readily reacts with oxygen and thus oxidation (or burning) starts at a low temperature. The degree of graphitization can be measured, for example, by a Raman spectrophotometry. Measurement by Raman spectrophotometry is described in "Saishin no Tanso Zairyou Jikken Gijutsu Bunseki Kaiseki Hen [Latest Carbon Material Experimental Techniques, Book: Analysis]" edited by the Carbon Society of Japan published by Sipec (November 2001), p. 89, left column, line 1 to p. 89, right column, line 20.

In one embodiment, the bed temperature of the DPF 14 is elevated up to a temperature at which low-graphitized soot burns and then, by the heat of combustion of the low-graphitized soot, may be elevated further to a temperature of 600° C. to 650° C.

Figure 12:
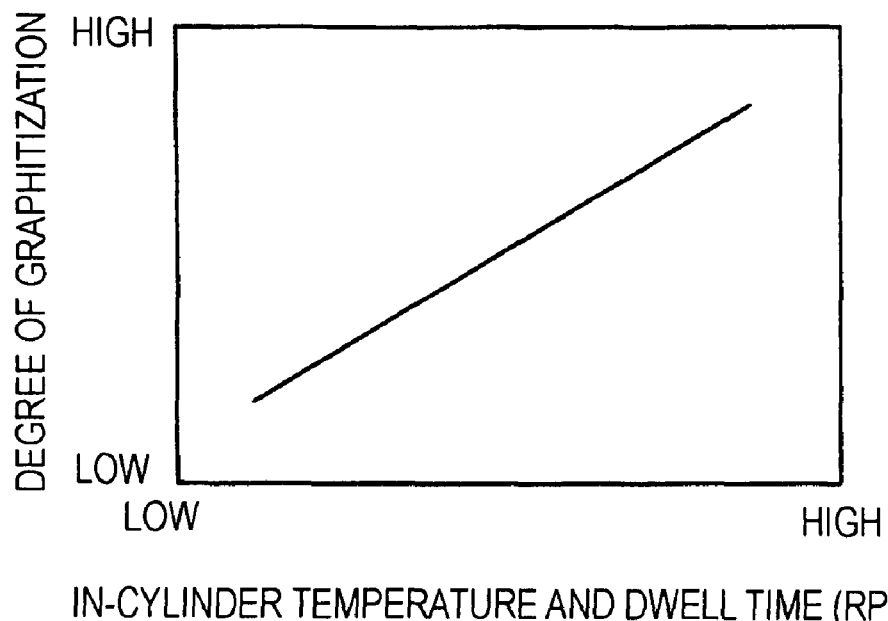
FIG. 12 is a graph showing the relationship between the degree of graphitization and the in-cylinder temperature and dwell time (engine speed)

However, if the amount of low-graphitized soot is not sufficient, the bed temperature may not be sufficiently elevated to the temperature required to burn the PM completely. The degree of graphitization depends at least in part upon the engine operating conditions, or the driving conditions, at the time the soot is discharged from the engine. As shown in FIG. 12, when the engine is driven such that the in-cylinder temperature is low or the engine speed is high, i.e., when the dwell time of gas (particularly burned gas) in the cylinder is short, the soot discharged under such driving conditions exhibits a low degree of graphitization. The degree of graphitization increases as the in-cylinder temperature increases or as the engine speed decreases. The fact that the degree of graphitization of graphite changes with temperature during formation is described in "Shin Tanso Zairyou Nyumon [New Introduction to Carbon Materials]" edited by the Carbon Society of Japan published by Sipec (August 1998), p. 24, left column, line 1 to p. 24, left column, line 21.

Thus, before starting the DPF regeneration control, the engine may be driven or otherwise operated under such conditions that allow discharge of soot with a low degree of graphitization so that a sufficient amount of low-graphitized soot is deposited on the pm in the DPF by the time the DPF regeneration control is started.

Since there are upper limits to the possible in-cylinder temperature and possible engine speed due to the specifications of the engine, the lower limit of the degree of the graphitization is determined, at least in part, according to the specification of the engine. In this description, the degree of graphitization is expressed as "low" when it is equal to the degree of graphitization of the soot generated in the engine high-rotation speed region of a given engine design and as "high" when it is equal to the degree of graphitization of the soot generated in the low-intermediate rotation speed region for the engine.

This control process executed by the ECU 10 will now be described in detail with reference to FIGS. 2 to 5.

Figure 2:
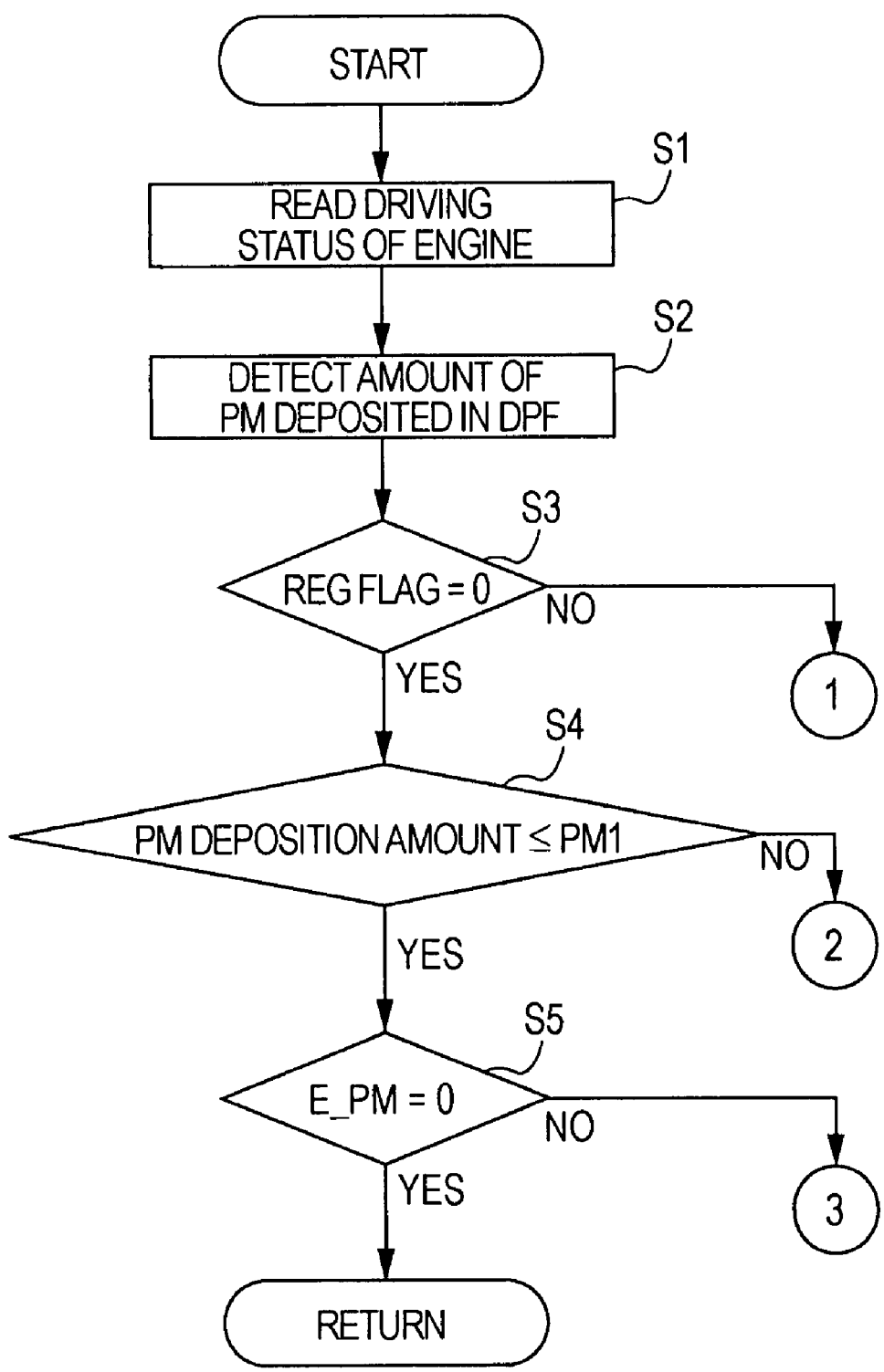
FIG. 2 is a control flowchart (No. 1) of the embodiment of FIG. 1.
Figure 3:
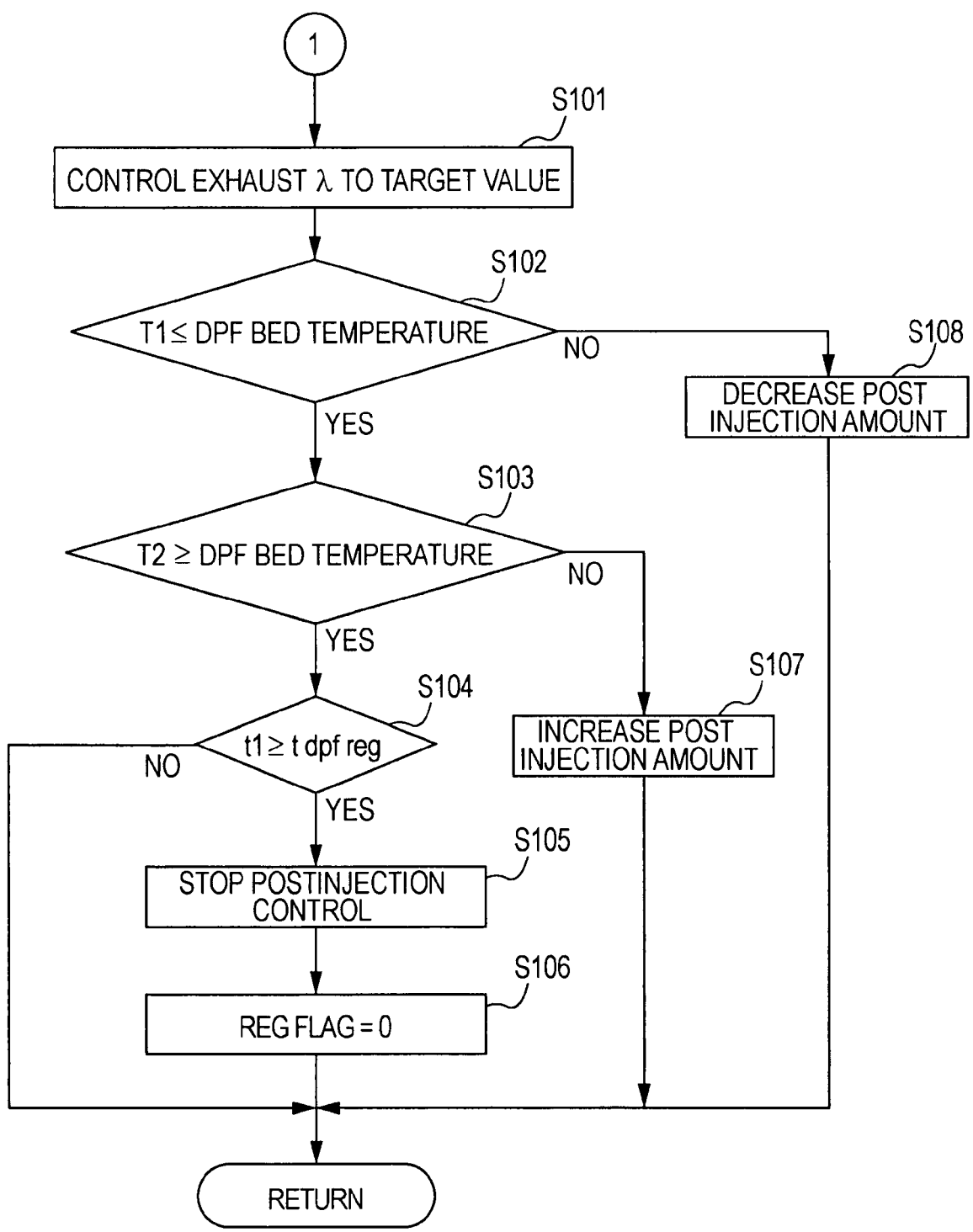
FIG. 3 is a control flowchart (No. 2) of the embodiment of FIG. 1.
Figure 4:
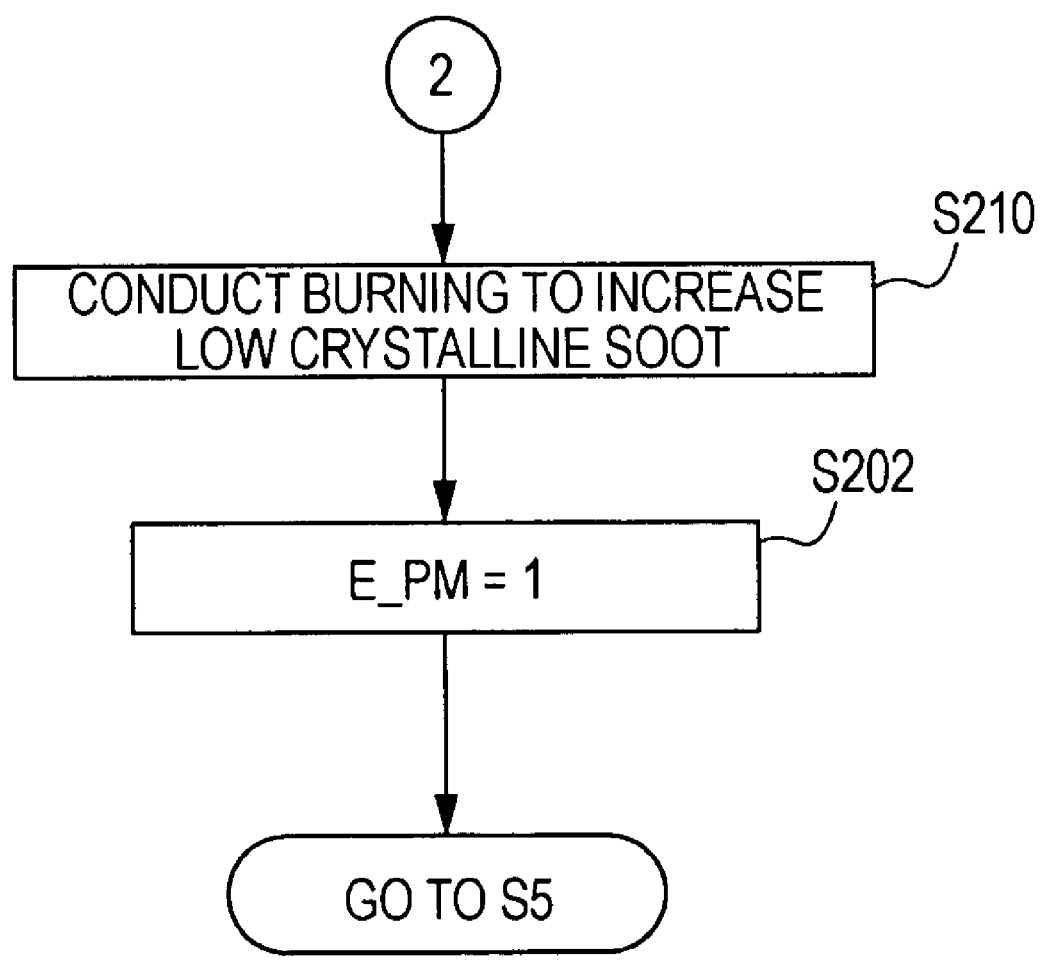
FIG. 4 is a control flowchart (No. 3) of the embodiment of FIG. 1.
Figure 5:
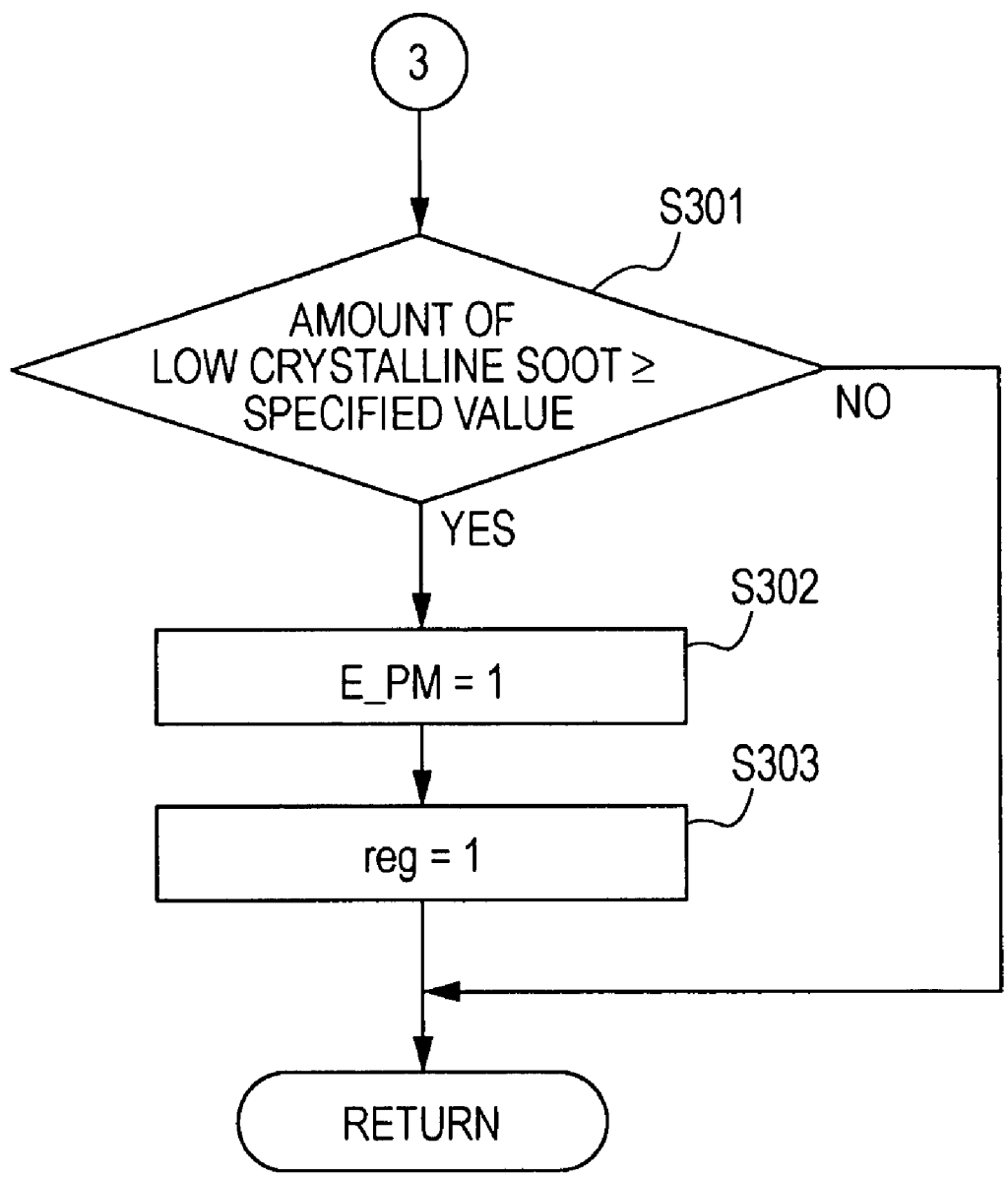
FIG. 5 is a control flowchart (No. 4) of the embodiment of FIG. 1.

FIG. 2 is a main flowchart showing the DPF regeneration control procedure. FIG. 3 is a flowchart showing the DPF regeneration procedure. FIG. 4 is a flowchart showing the control procedure for increasing the amount of soot that is deposited with a low degree of graphitization (low-graphitized soot-increasing means). FIG. 5 is a flowchart showing the procedure for detecting whether a prescribed amount of low-graphitized soot is deposited (means for detecting low-graphitized soot deposition amount).

In step S1 shown in FIG. 2, the values detected by the engine speed sensor 31 and the accelerator position sensor 32 are read. In this embodiment, reading of the engine speed sensor value and the accelerator position sensor value constitutes a means for detecting driving conditions.

In step S2, the amount of PM deposited in the DPF 14 is detected or estimated. One or more of several methods may be employed in the detection or estimation. For example, based on the understanding that the pressure in the exhaust gas channel 11 increases with the PM deposition amount, the deposition amount may be detected by calculating the difference in pressure $\Delta P$ between the pressure value observed or measured with a pressure sensor 33 and the atmospheric pressure. The calculated value of $\Delta P$ can be used to find the amount of deposition represented by the change in pressure on the basis of a map, chart, graph or table prepared in advance and showing a correlation between the value of $\Delta P$ and the expected PM deposition amount. Alternatively, the amount may be estimated on the basis of the driving history such as the distance traveled after the last DPF regeneration or the accumulated number of engine rotations. An estimate may be based upon the pressure inside of the exhaust gas channel 11. The amount of PM deposited may be determined by providing a differential pressure detector for detecting a difference in pressure of the exhaust gas channel 11 between an upstream portion and a downstream portion of the DPF 14 and by determining the amount of PM deposited on the basis of a map, chart, graph, or table prepared in advance and indicating the relationship between the difference in pressure and the PM deposition amount.

In step S2, based on the driving history since completion of the last DPF regeneration control, the degree of graphitization of the soot contained in the PM deposited is estimated and written into a memory.

In step S3, whether to start DPF regeneration is determined and controlled on the basis of a regeneration request flag register (hereinafter referred to as a "flag reg"). When regeneration request the flag reg value is zero, (reg=0) i.e., when there is no request for regeneration, the process proceeds to step S4. When the flag reg value is one (reg=1), i.e., when there is a request for regeneration, the process indicated by the flowchart shown in FIG. 3 is executed to regenerate the DPF.

In step S4, it is determined whether the amount of PM deposited in the DPF 14 is not more than a specified value, PM1. The specified value of PM1 is set to be a value smaller than the PM deposition amount at which the DPF regeneration control must be started (DPF regeneration-starting deposition amount). This will allow starting a control process of depositing soot for purposes of increasing the temperature by burning the soot. For example, the PM1 is set to a value smaller than the amount of PM deposited at which DPF regeneration is to be started. Thus the control may be started at PM1 when the deposition amount is smaller than the DPF regeneration-starting deposition amount so that even when all the soot contained in the PM, (namely the deposition amount that is detected in step S2), has a high degree of graphitization, it is still possible to deposit a sufficient amount of low-graphitized soot for increasing the bed temperature of the DPF 14 to a burning temperature of the high-graphitized soot. As indicated in this specification the burning of the low graphitized soot may be initiated by conducting driving control. For example, the driving control may be as described below and may start from the time PM is detected to be at the PM1 value and may continue up to when the require amount of low graphitized soot deposition is obtained for starting regeneration burning at the DPF. Thus, the driving control to deposit soot starts a PM1 and continues until the DFP regeneration-starting deposition amount is reached.

If the detected or measured PM amount is not more than the prescribed amount PM1, the process proceeds to step S5. If the PM amount exceeds the prescribed amount PM1, the procedure shown in the flowchart of FIG. 4 is executed to increase the amount of low-graphitized soot.

In step S5, whether the mode requires an increase in amount of low-graphitized soot is determined on the basis of a flag, E-PM.

If it is determined that the current mode does not require an increase in the amount of low-graphitized soot (if the flag E-PM=0), then the process proceeds to RETURN. If it is determined that the current mode requires an increase in the amount of low-graphitized soot (if flag E-PM=1), then the process of the flowchart shown in FIG. 5 is executed.

The flow chart in FIG. 3 shows a procedure to be executed when the DPF regeneration request flag reg is 1 in step S3. This flowchart shows a control routine from determination to start regeneration of the DPF up to completion of the DPF regeneration.

In step S101, an exhaust gas temperature and an excess air ratio are controlled to increase the filter bed temperature of the DPF 14 up to a temperature at which regeneration of the DPF is possible. This control may be performed for example, by one or more procedures such as a post-injection of fuel that is initiated after the main injection of fuel to the engine 1, an intake air reduction achieved by reducing the opening of the intake throttling valve 8, and a retardation of the main injection timing. In an embodiment as depicted, the control for raising the exhaust gas temperature includes adjustment of the opening of the intake throttling valve 8 and post-injection.

In step S102, whether the bed temperature of the DPF 14 is higher than the upper limit T1 of the target bed temperature for DPF regeneration is determined. The upper limit T1 of the target bed temperature is set to a temperature not more than the lower limit of the burning temperature range of the high-graphitized soot. For example, T1 is set to about 600° C.

If the bed temperature of the DPF 14 is higher than T1, the process proceeds to step S108, and the post-injection amount of fuel is reduced to decrease the bed temperature. If the bed temperature of the DPF 14 is lower than or equal to T1, the process proceeds to step S103.

In step S103, it is determined whether the bed temperature of the DPF 14 is lower than the lower limit T2 of the target bed temperature for DPF regeneration. If the temperature is lower than T2, then the process proceeds to step S107, and the post-injection amount is increased to increase the bed temperature. The lower limit T2 of the target bed temperature is set to a temperature near the lower limit of the burning temperature range of low-graphitized soot. For example, T2 is set to about 500° C.

In step S104, it is determined whether a time period that has elapsed since the start of DPF regeneration, designated here as elapsed time t1, exceeds a time period designated as t_dpf_reg that is necessary for DPF regeneration to be completed. The elapsed time t1 is a time taken starting from when the determination in step S103 is rendered as YES, (i.e., when the DPF bed temperature enters the range between the lower limit T2 and the upper limit T1 of the target bed temperature), and increases for the duration of the regeneration.

The time t_dpf_reg that is necessary for DPF regeneration to be completed is the amount of time required to burn away all PM deposited in the DPF 14 as measured from the beginning of the DPF regeneration by burning.

If the elapsed time t1 is not more than the time t_dpf_reg necessary for DPF regeneration, then the process proceeds to RETURN. If t1 is more than time t_dpf_reg, then the process proceeds to step S105.

In step S105, the control of post-injection fuel and intake air reduction is stopped.

In step S106, the regeneration request flag reg is returned to zero and the process is ended.

A flowchart in FIG. 4 shows a procedure to be executed when the PM deposition amount is determined, in step S4 of FIG. 2, to exceed PM1.

In step S201, in order to increase the amount of low-graphitized soot deposited in the DPF 14, the amount of low-graphitized soot discharged from the diesel engine main unit 1 is increased. As described above, low-graphitized soot is discharged when the in-cylinder temperature is low or when the dwell time of the gas in the cylinder is short.

One or more of the following techniques can be employed to control the decrease the in-cylinder temperature.

Figure 14:
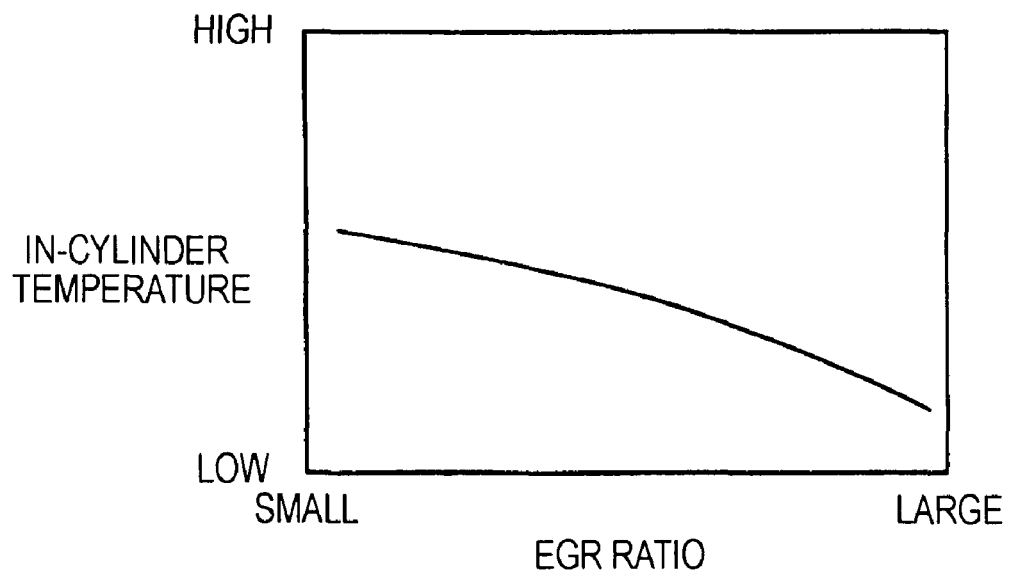
FIG. 14 is a graph showing the relationship between the in-cylinder temperature and EGR ratio.

One technique is to increase the EGR ratio. This technique utilizes the property that, as shown in FIG. 14, the in-cylinder temperature decreases with an increase in EGR. This is due to an increase in amount of EGR gas having a large specific heat.

Figure 15:
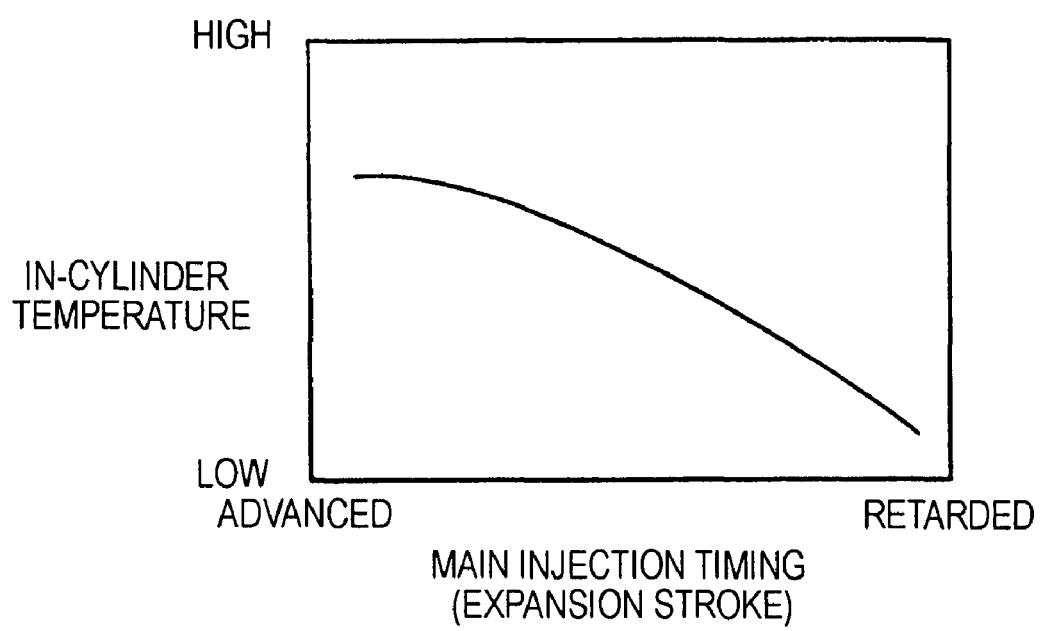
FIG. 15 is a graph showing the relationship between the in-cylinder temperature and the main injection timing during the expansion stroke.

Another possible technique is to retard the main injection timing of fuel injection and then proceed to the expansion stroke. This technique utilizes the property that, as shown in FIG. 15, when the main injection timing is retarded and the expansion stroke occurs, the in-cylinder temperature decreases as the amount of retardation increases.

It should be noted that when the intake temperature is decreased, as for example, by using an intercooler 7, the increase in the in-cylinder temperature during burning can be suppressed, and the upper limit of the degree of graphitization of the soot produced can be lowered.

A method of increasing the engine speed is usable as a method for shortening the dwell time of the gas in the engine cylinders. This can be realized, for example in the case of the engine powering a vehicle, by shifting gears to the high-speed side (decreasing the transmission gear ratio). This method is applicable to any automatic transmission, stepped or stepless. The dwell time of the gas in the cylinder can also be shortened by advancing the timing for opening the exhaust gas valve. This will discharge the in-cylinder gas from the cylinder at an early stage.

Thus, in step S201, one or a combination of the above-described techniques may be employed to allow low-graphitized soot to be discharged from the diesel engine main unit 1 and to increase the amount of low-graphitized soot deposited in the DPF 14.

When the system is equipped with a compression ratio-varying mechanism as described in U.S. Pat. No. 6,390,035, which is hereby incorporated by reference, the in-cylinder temperature may be decreased in step S201 by shifting the compression ratio to the low-compression-ratio side.

In step S202, when the flag E-PM is turned on indicating the mode requiring an increase in amount of low-graphitized soot (i.e., when E-PM=1), the process proceeds to step S5 in FIG. 2.

A flowchart in FIG. 5 shows a procedure to be executed when E-PM is determined, in step S5 of FIG. 2, not to be zero.

In step S301, it is determined whether the amount of low-graphitized soot reaches a prescribed amount. In one or more embodiments the determination may be made as follows.

First, for example, based upon the driving history and the estimated degree of graphitization of the soot contained in the deposited PM, the amount of high-graphitized soot and the amount of low-graphitized soot may be estimated. The estimated may be made in part on the basis of the distance traveled as in step S2 in FIG. 2. The amount of low-graphitized soot sufficient for burning away the deposited high-graphitized soot by heat of combustion is then set as the prescribed amount of low graphitized soot, and whether the amount of low-graphitized soot reaches the prescribed amount may be determined.

Upon determining that the prescribed amount is reached, the process goes to step S302. If the determination is NO, then the process goes to RETURN. In this manner, the internal combustion engine is driven under driving conditions that decrease the in-cylinder temperature or shorten the dwell time of cylinder gas in the cylinder for a predetermined time until the amount of low-graphitized soot reaches the prescribed amount.

In step S302, the flag E-PM is set to zero. In step S303, the regeneration request flag reg is set to 1, and the process goes to RETURN.

The above-described control process can be summarized as follows: When the time for DPF initiating regeneration is near, low-graphitized soot is deposited onto the DPF in an amount sufficient for ensuring burning of high-graphitized soot having a high burning temperature. During the DPF regeneration control, the bed temperature is increased to a burning temperature of the low-graphitized soot (for example to a burning temperature in the range of about 500° C. (T1) to about 600° C. (T2)), and the heat of combustion generated thereby is used to increase the bed temperature to the burning temperature of the high-graphitized soot, for example an increase to a temperature in the range of about 600° C. to 650° C.

Among the components of the PM, it is the high-graphitized soot that has the highest burning temperature. Burning the high-graphitized soot means burning the deposited PM itself.

Thus, the amount of fuel required for providing the heat to burn the PM is reduced, and degradation in fuel consumption due to DPF regeneration control can be reduced.

One or more embodiments of the invention as describe may be useful in the following respects.

During the DPF regeneration control, degradation in fuel consumption due to DPF regeneration control can be suppressed. This results because the bed temperature is increased to the burning temperature of the low-graphitized soot and the heat generated by combustion of low-graphitized soot is used to increase the bed temperature to the burning temperature of high-graphitized soot.

Figure 6:
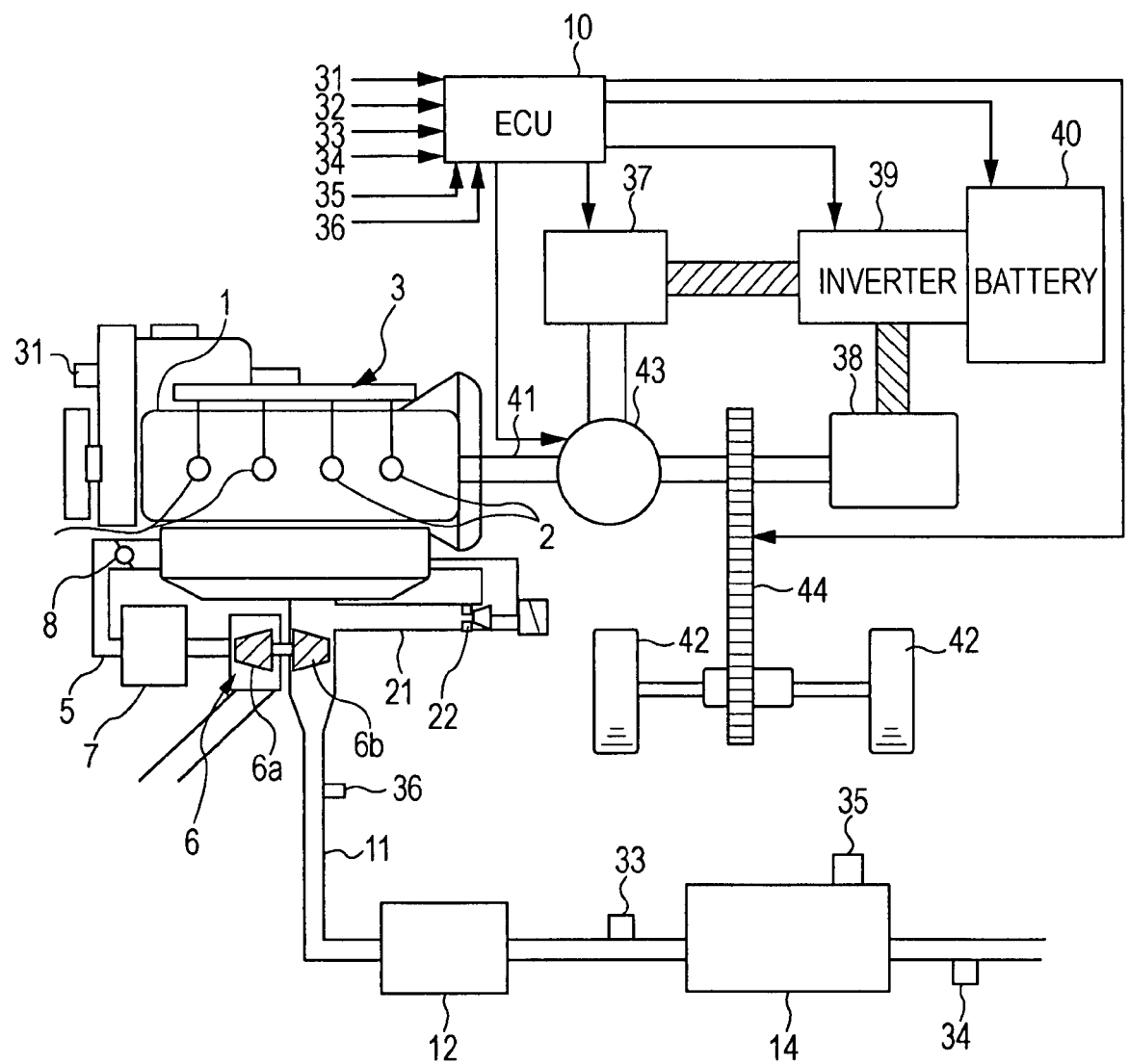
FIG. 6 is a schematic structural diagram of a system to which an alternative embodiment of the invention is applied.

Moreover, the bed temperature can be reliably increased to the burning temperature of the high-graphitized soot by using the heat of combustion of the low-graphitized soot. This may be achieved because the amount of low-graphitized soot is increased by changing the driving conditions before starting DPF regeneration control, FIG. 6 is a schematic structural diagram showing a system of an alternative embodiment of the present invention. For example, such an alternative embodiment may be applied to a hybrid car that uses, as a driving source, other motors, such as electric motors, in addition to the same or a similar diesel engine main unit 1 as that of the one or more of the embodiments described above.

The system shown in FIG. 6 includes a transfer 43, a second motor 37 serving as a generator, a first motor 38 serving as a driving source, an inverter 39, a battery 40, drive wheels 42, and a reduction gear 44. The driving force generated in the diesel engine main unit 1 is input to the transfer 43 through a drive shaft 41. In the transfer 43, the input driving force is divided into a force for driving the second motor 37 (when it is operating as a generator to charge the battery 40) and a force for driving the drive wheels 42. The division of driving force is conducted on the basis of the driving force required by the vehicle and the state of charge (SOC) of the battery 40.

The electric power generated from the second motor 37 is charged into the battery 40 through the inverter 39. The electric power of the battery 40 is input to the first motor 38 through the inverter 39 so that the power is used for driving the drive wheels 42.

When the battery SOC is low, part of the driving force generated in the diesel engine main unit 1 is used to generate power in the second motor 37 and to charge the battery. When the battery SOC is more than sufficient, the first motor 38 is driven to assist driving or the car is driven only by the driving force from the first motor 38. The control therefor is executed by the ECU 10 on the basis of the driving status or battery SOC.

The DPF regeneration control in the hybrid car will be described with reference to FIGS. 7 to 11.

Figure 7:
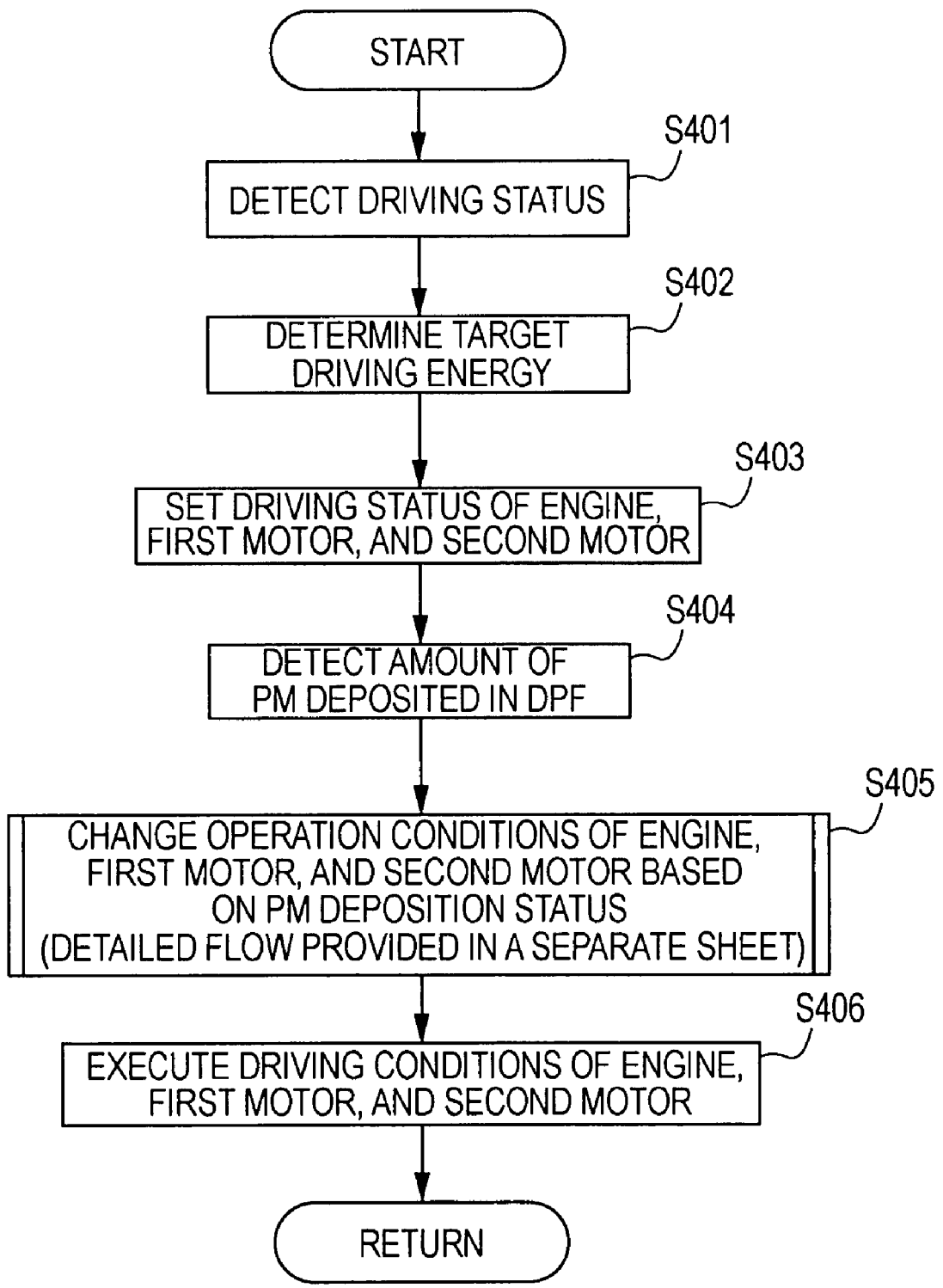
FIG. 7 is a control flowchart (No. 1) of the embodiment of FIG. 6.

FIG. 7 is a flowchart of control for setting the driving conditions of the diesel engine main unit 1, the first motor 38, and the second motor 37.

In step S401, the driving conditions are detected as in step S1 in FIG. 2.

In step S402, the target driving energy is determined on the basis of the detected driving conditions and the map prepared in advance, for example.

In step S403, the driving conditions of the diesel engine main unit 1, the first motor 38, and the second motor 37 are set according to the target driving energy.

For example, when the target driving energy is smaller than the current output from the diesel engine main unit 1 and the battery SOC is low, the output from the diesel engine main unit 1 is maintained and part of the output is regenerated by the second motor 37 to charge the battery 40. When the target driving energy is larger than the current output from the diesel engine main unit 1 and the battery SOC is more than sufficient, the first motor 38 is driven by the electric power from the battery 40 to assist driving.

In step S404, the amount of PM deposited in the DPF 14 is detected as in step S2 in FIG. 2.

Figure 8:
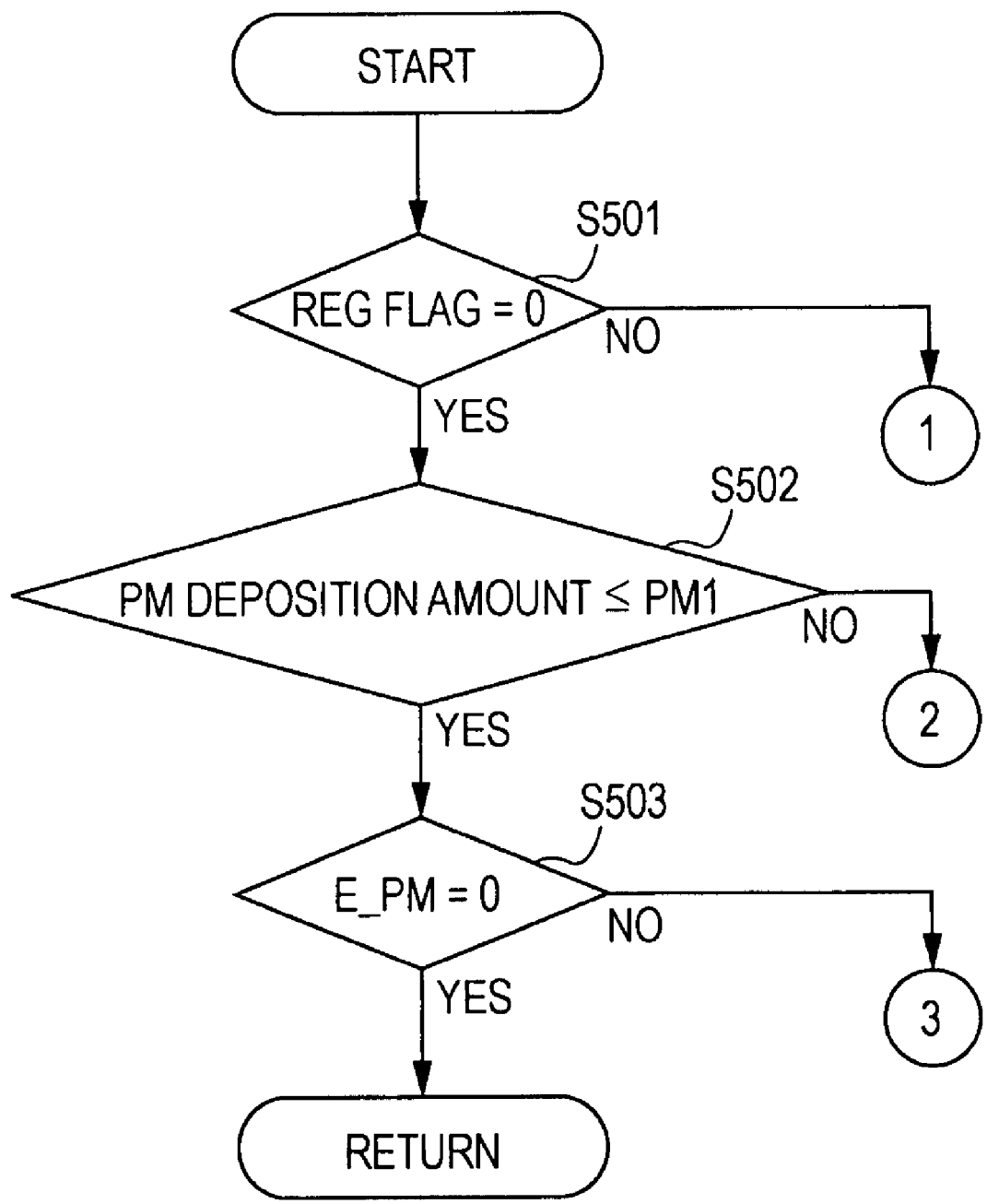
FIG. 8 is a control flowchart (No. 2) of the embodiment of FIG. 6.

In step S405, the driving conditions of the diesel engine main unit 1, the first motor 38, and the second motor 37 are changed through a process indicated by the flowchart shown in FIG. 8. Since steps S501 to S503 in FIG. 8 are the same as steps S3 to S5 in FIG. 2, the description therefor is omitted.

In step S406, the car is driven under driving conditions changed in step S405.

Figure 9:
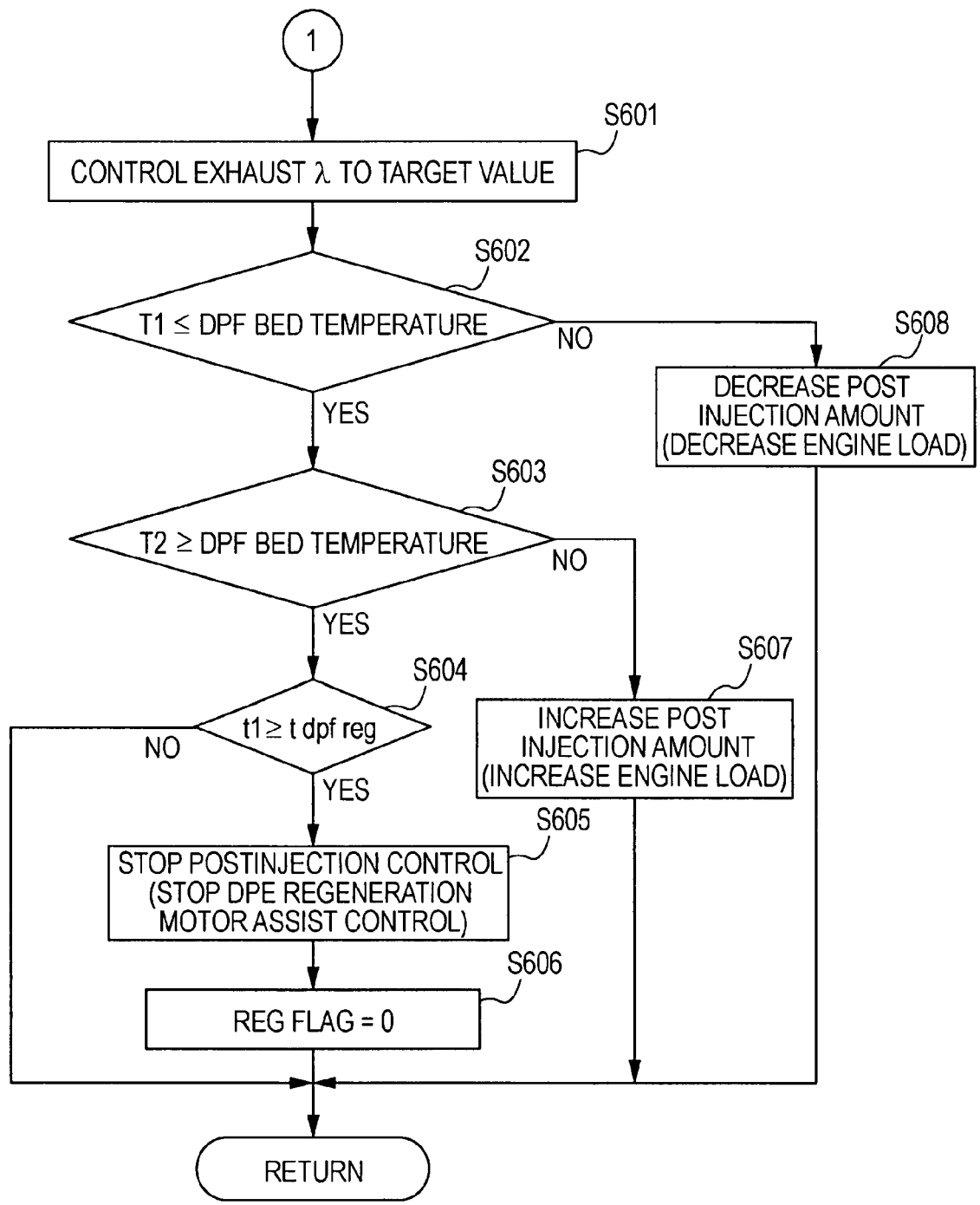
FIG. 9 is a control flowchart (No. 3) of the embodiment of FIG. 6.

In FIG. 9 a flowchart shows a process executed when the regeneration request flag reg is 1 in step S501 in FIG. 8.

The flowchart in FIG. 9 is basically the same as that in FIG. 3. However, since the flowchart in FIG. 9 concerns a hybrid car, adjustment of the bed temperature in steps S607 and S608 corresponding to steps S106 and S107 may be conducted by a different method. For example, in order to increase the bed temperature, the load on the diesel engine main unit 1 is increased so that an output in excess of the requested output is regenerated in the second motor 37. In such a case, when the battery SOC reaches saturation or a maximum charge, the temperature is increased by post-injection as in step S107. In order to decrease the bed temperature, the load on the diesel engine main unit 1 is decreased.

When the bed temperature is adjusted through the amount of regeneration in the second motor 37, the engine load is decreased by suspending the operation of the second motor 37 (returning the engine load to original level) instead of suspending the post-injection control in step S605 corresponding to step S105 in FIG. 3.

Figure 10:
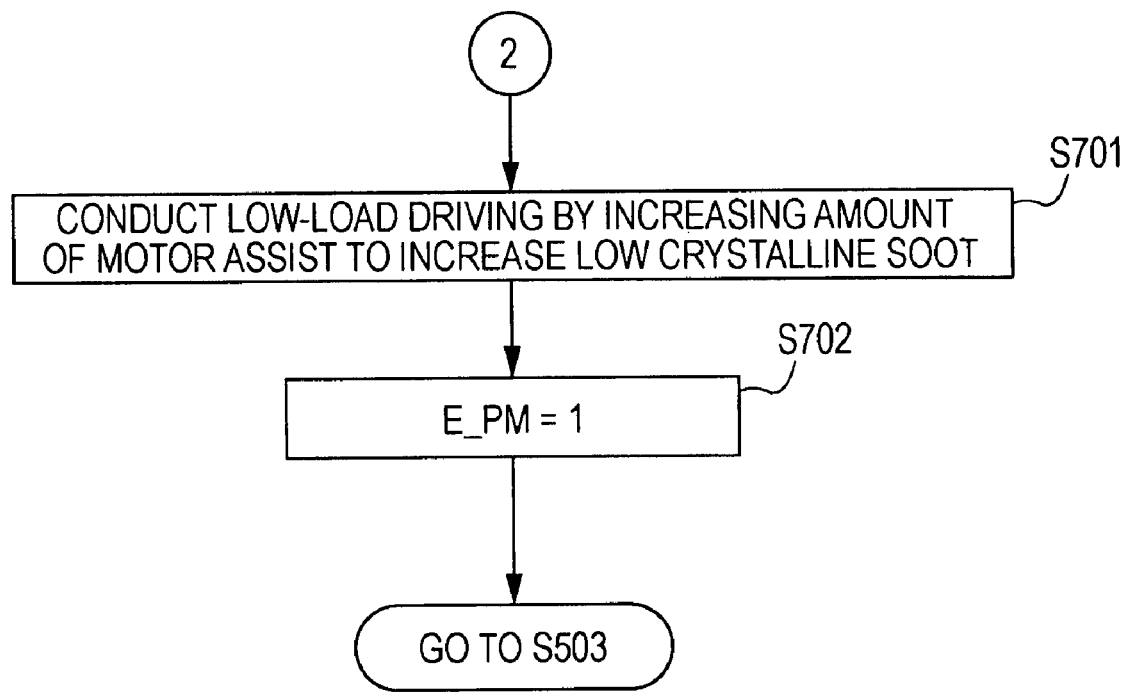
FIG. 10 is a control flowchart (No. 4) of the embodiment of FIG. 6.
Figure 11:
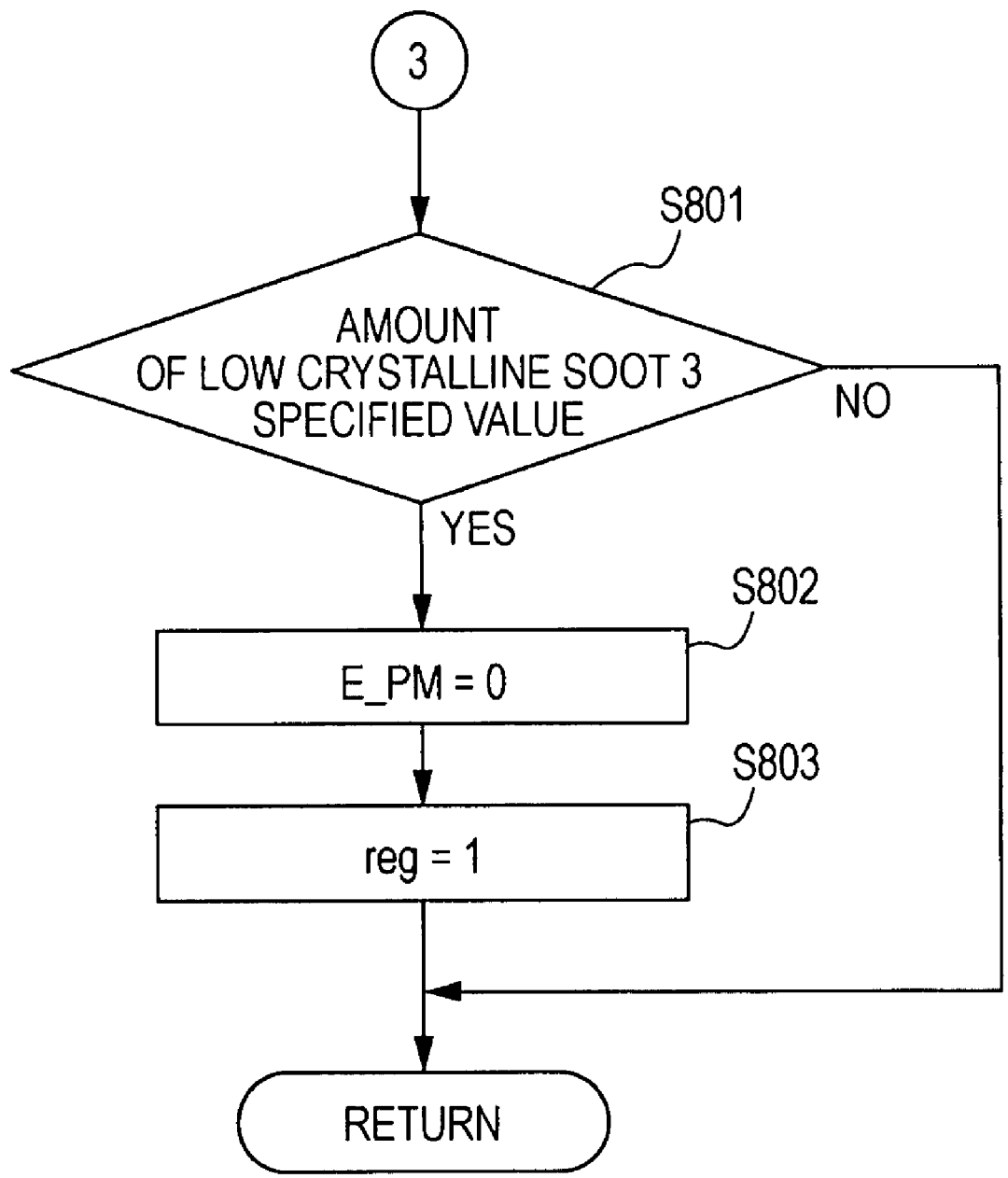
FIG. 11 is a control flowchart (No. 5) of the embodiment of FIG. 6.

A flowchart shown in FIG. 10 shows a process executed when it is determined in step S502 that the PM deposition amount has reached a prescribed amount.

The flowchart shown in FIG. 10 is basically the same as that in FIG. 4. However, control for increasing the amount of low-graphitized soot executed in step S701 is different.

In this process, the driving force of the first motor 38 is increased to drive the diesel engine main unit 1 under a low load to thereby decrease the in-cylinder temperature.

If the battery SOC is low and the first motor 38 cannot assist driving, the control in step S201 is executed.

The process shown in the flowchart of FIG. 1 is executed when the flag E-PM is 1 in step S503. This is the same as shown in the flowchart in FIG. 5. Thus, the description thereof is omitted to avoid redundancy.

The hybrid car of an alternative embodiment can also have uses similar to those of an embodiment as applied to an engine driven vehicle.

While the invention has been described with respect to a limited number of embodiments, those skilled in the art, having benefit of this disclosure, will appreciate that other embodiments can be devised which do not depart from the scope of the invention as disclosed herein. It should be understood that the present invention is not limited by the embodiments described above, and various modification are possible without departing from the technical concept in the claims. Accordingly, the scope of the invention should be limited only by the attached claims.

What is claimed:

1. A method for regenerating a filter of the type that traps particulate matter contained in exhaust gas of an internal combustion engine, the method comprising:
   increasing an amount of soot having a low degree of graphitization in the filter; and
   increasing a temperature of the filter after the amount of the soot having the low degree of graphitization is increased,
   wherein the temperature of the filter is increased to a temperature at which the soot having the low degree of graphitization in the filter burns, and
   wherein the low degree of graphitization is defined as the degree of graphitization of soot generated when the engine operates at a high-rotation speed.

2. The method of claim 1, wherein the amount of the soot having the low degree of graphitization in the filter is increased by operating the internal combustion engine under conditions that decrease an in-cylinder temperature.

3. The method of claim 1, wherein the amount of the soot having the low degree of graphitization in the filter is increased by operating the internal combustion engine under conditions that shorten a time that cylinder gas dwells in a cylinder.

4. The method of claim 1, wherein the amount of the soot having the low degree of graphitization in the filter is increased by operating the internal combustion engine accompanied by at least one control of the engine selected from: an increase in engine speed and an advancement of timing for opening an exhaust gas valve.

5. The method according of claim 1, further comprising:
   determining an amount of the particulate matter trapped in the filter, and
   wherein the amount of the soot having the low degree of graphitization is increased after the amount of the particulate matter trapped in the filter reaches a predetermined amount.

6. The method of claim 1, wherein the temperature at which the soot having the low degree of graphitization in the filter burns is in a range of about 500° C. to about 600° C.

7. A method for regenerating a filter of the type that traps particulate matter contained in exhaust gas of an internal combustion engine, the method comprising:
   operating the internal combustion engine under operating conditions that decrease an in-cylinder temperature or that shorten a time cylinder gas dwells in a cylinder; and
   increasing a temperature of the filter after the operating of the internal combustion engine is continued under the operating conditions for a predetermined time,
   wherein the temperature of the filter is increased to a temperature at which the soot having the low degree of graphitization in the filter burns.

8. An apparatus for purifying exhaust gas from an internal combustion engine, comprising:
   a filter that traps particulate matter contained in exhaust gas of the internal combustion engine; and
   a controller connected to the internal combustion engine,
   wherein the controller operates the internal combustion engine so as to increase an amount of soot having a low degree of graphitization in the filter and, after the amount of the soot having the low degree of graphitization is increased, operates the internal combustion engine so as to increase a temperature of the filter, and
   wherein the controller operates the internal combustion engine so as to increase the temperature of the filter to a temperature at which the soot having the low degree of graphitization in the filter burns and
   wherein the low degree of graphitization is defined as the degree of graphitization of soot generated when the engine operates at a high-rotation speed.

9. The apparatus of claim 8, wherein the controller operates the internal combustion to increase the amount of soot having the low degree of graphitization in the filter under operating conditions that decrease an in-cylinder temperature.

10. The apparatus of claim 8, wherein the controller operates the internal combustion engine to increases the amount of the soot having the low degree of graphitization in the filter under operating conditions that shorten a time cylinder gas dwells in a cylinder.

11. The apparatus of claim 8, wherein the amount of the soot having the low degree of graphitization in the filter is increased by the controller operating the internal combustion engine accompanied by at least one control selected from: an increase in engine speed and an advancement of timing for opening an exhaust gas valve.

12. The apparatus of claim 8, wherein the controller determines an amount of particulate matter trapped in the filter and operates the internal combustion engine so as to increase the amount of the soot having the low degree of graphitization in the filter after the amount of the particulate matter trapped in the filter is determined to reach a predetermined amount.

13. The apparatus of claim 8, wherein the temperature at which the soot having the low degree of graphitization in the filter burns is in a range of about 500° C. to about 600° C.

14. An apparatus for purifying exhaust gas from an internal combustion engine, comprising:
- a filter that traps particulate matter contained in exhaust gas of the internal combustion engine; and
- a controller connected to the internal combustion engine, wherein the controller operates the internal combustion engine under operating conditions that decrease an in-cylinder temperature or that shorten a time cylinder gas dwells in a cylinder and, after the operating of the internal combustion engine is continued under the operating conditions for a predetermined time, operates the internal combustion engine to increase a temperature of the filter, wherein the temperature of the filter is increased to a temperature at which the soot having the low degree of graphitization in the filter burns.

15. Means for regenerating a filter of the type that traps particulate matter contained in exhaust gas of an internal combustion engine, comprising:
- means for increasing an amount of soot having a low degree of graphitization in the filter, and
- means for increasing a temperature of the filter up to a temperature at which the soot having the low degree of graphitization in the filter burns, after the amount of the soot having the low degree of graphitization in the filter is increased.

* * * * *